Jan. 27, 1959 B. V. VONDERSCHMITT 2,871,405
RASTER CENTERING CONTROL
Filed Oct. 25, 1954
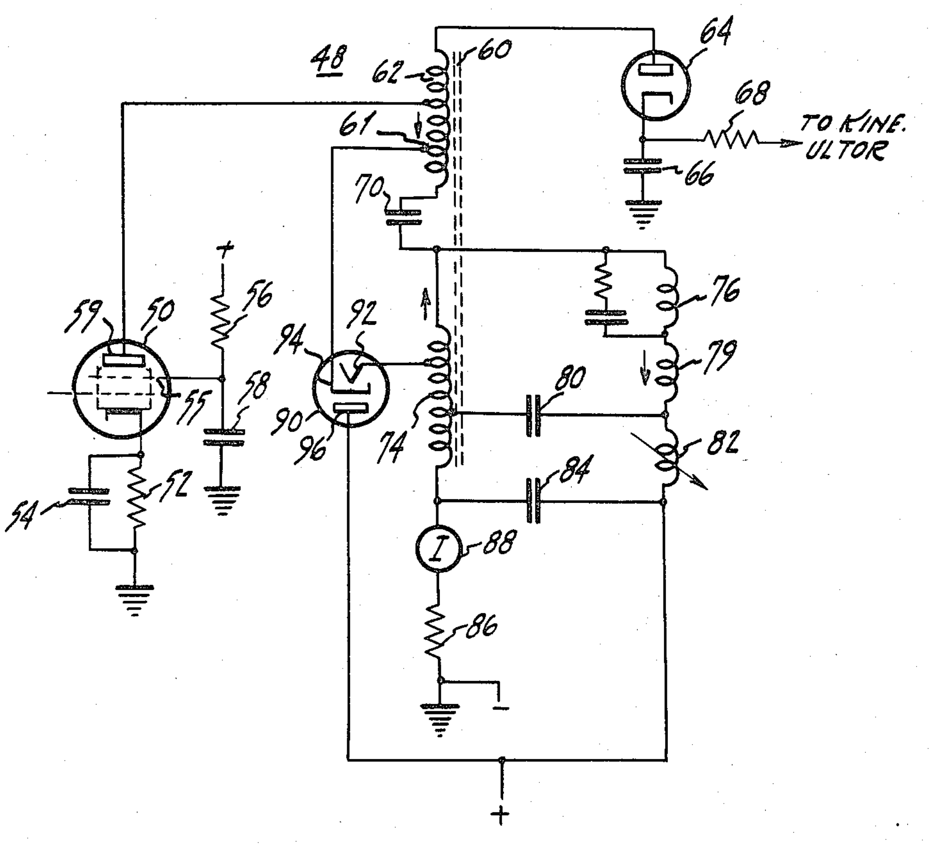
INVENTOR.
BERNARD V. VONDERSCHMITT
BY
ATTORNEY United States Patent Office 2,871,405

Patented Jan. 27, 1959

2,871,405

RASTER CENTERING CONTROL

Bernard V. Vonderschmitt, Merchantville, N. J., assignor to Radio Corporation of America, a corporation of Delaware Application October 25, 1954, Serial No. 464,424

8 Claims. (Cl. 315—27)

The invention relates to deflection systems for television receivers and it particularly pertains to a circuit arrangement having means for centering the raster produced by an electron beam in a cathode ray tube.

In present television practice, an image is reproduced on the face of a cathode ray tube, or kinescope, by an electron beam which is deflected to trace successive lines forming a raster on the fluorescent screen. Deflection of the electron beam may be accomplished electrostatically or magnetically. In magnetic deflection systems a sawtooth wave of current is applied to the windings of a deflection system arranged about the neck of the cathode ray tube. Sawtooth deflection waves, generated by appropriate circuits in the television receiver, amplified in an output power amplifier tube, are impressed upon an output transformer and thence upon the windings of the deflection system.

The anode of the output power amplifier tube is normally connected to a point of direct operating potential by way of a circuit path which includes a portion of the output transformer winding, usually through a damping tube circuit. The size of the core of the transformer is in part proportional to this direct current flow because the magnetic core material of the output transformer tends to be saturated due to this current. It is obvious that as the size of the output core is increased, the cost of the transformer is also increased.

In horizontal deflection wave generating circuit arrangements there is a fundamental non-linearity which brings about spread on the left hand side of the screen and compression on the right hand side due to the action of the damper tube and other factors. This non-linearity may be compensated for by the use of a variable inductor which shifts the phase of the point in each operating cycle at which the driver tube becomes operative and the damper tube becomes inoperative. This variable inductor is of such construction that it forms an appreciable part of the cost of a horizontal deflection circuit for standard television receiver. It is desired in the simpler and lower priced receivers to eliminate this linearity control and it may be done with reasonable results with some deterioration of horizontal linearity. This causes some difficulty in the horizontal centering which if provided by a focus coil or by a centering magnet on electrostatically-focused kinescopes causes neck shadow difficulties. This may be corrected by passing direct current through the deflection system windings. Any flow of direct current in the deflection system winding which also flows through a winding of the output transformer will have an effect on the saturation of the transformer core, depending upon the direction of direct current flow with respect to the flow of anode current to the output tube. It is desirable to limit direct current flow through the output transformer from the deflection system windings to a direction opposing that of the anode current to minimize saturation of the transformer core and thereby permit a smaller core to be used with fully effective results.

In the absence of any control over the linearity the electron beam is apt to require shift in its direction prior to deflection to center the raster on the face of the kinescope. This movement of the beam prior to deflection causes the beam to strike the neck portion of the cathode ray tube forming neck-shadows on the screen of the cathode ray tube or kinescope. This is particularly true of the simpler receivers which do not employ any form of linearity control.

An object of the invention is to provide improved means for applying centering current to a deflection system winding without adversely affecting saturation of the output transformer.

Another object of the invention is to provide an improved circuit arrangement employing the direct current flow in the other circuits of the receiver to center the raster, and thereby eliminate a need for a separate direct current source for this purpose.

A further object is to provide a circuit arrangement boosting the energizing voltage and providing centering current in an economical manner and without affecting performance of the overall circuit.

A more specific object of the invention is to employ an inductance element both as a raster width control and as a D.-C. path for inserting centering current through deflection windings where the windings are not returned to A.-C. ground.

The objects of the invention are attained in a circuit arrangement wherein energy for a horizontal deflection wave amplifier device is applied through a damper tube and a portion of a winding on the transformer is connected to the first winding by means of a capacitor functioning both as the A.-C. coupling capacitor and as the energizing voltage boosting capacitor. The deflection system windings are connected in series with an inductance element forming a raster width control, across the secondary winding of the output transformer. A galvanic connection is made between terminals of the windings to form a series circuit and a capacitor is connected to the terminals of the series connected windings. The junction between the deflection wave winding and the capacitor is connected to a load element which preferably is a portion of the remainder of the television receiver. The terminal of the inductance element at the end of the series circuit is connected to the positive pole of a source of potential used to energize the receiver. The junction between the deflection windings and the width control inductor is coupled by means of a further capacitor tapping on the deflection wave winding to provide an A.-C. path for width control action and to block D.-C. flow. In this arrangement direct current flows through the deflection system windings, the deflection wave winding of the winding of the transformer and through the load element to return to the source of energizing power. By adjustment of the load element, the width control and other factors, the proper centering current is passed through the circuit and through the secondary winding of the transformer in a manner to oppose the flow of current through the first said winding of the transformer and thereby decrease the saturation of the transformer core.

In order that the invention may be more clearly understood and readily put to practice a specific embodiment of a circuit arrangement according to the invention, given by way of example only, is described with reference to the accompanying drawing forming a part of the specification and in which:

The sole figure is a schematic diagram of a horizontal deflection circuit arrangement according to the invention.

The sole figure of the drawing is a schematic diagram of the horizontal deflection wave and high voltage generating circuit arrangement of a television receiver which otherwise consists of circuits which may be entirely conventional in all respects and are mentioned solely to illustrate the setting of the invention. In such a receiver television signals appearing at an antenna applied to a radio frequency wave amplifying circuit and the output therefrom is applied along with a wave from a local oscillation generating circuit to a frequency changing circuit. The output of the frequency changing circuit is applied to an intermediate frequency amplifying circuit which may be an individual picture, or pix, intermediate frequency amplifying circuit or one amplifying both pix and sound intermediate frequency signals. A demodulating circuit is coupled to the I. F. amplifying circuit for deriving the video wave from the television signals. The detected video wave signals are amplified in a video frequency amplifying circuit and thereafter applied to the input circuit of an image reproducing device or kinescope. Sound signals are derived from the frequency changing circuit, or from the I. F. amplifying circuit, or from the demodulating circuit 26 for further processing in an amplifying circuit, including an aural signal discrimimnating circuit, an audio frequency amplifying circuit, and a transducer or speaker. The output of the video amplifying circuit is also applied to a synchronizing pulse separating circuit to separate the synchronizing pulses from the image information and the vertical synchronizing pulses from the horizontal for application to a vertical deflection wave generating circuit and to the horizontal deflection wave and high voltage generating circuit 48. The vertical deflection generating circuit and the horizontal deflection wave and high voltage generating circuit 48 are connected to the kinescope to furnish the necessary vertical and horizontal deflection and ultor potentials. An A. G. C. amplifying and distributing network is coupled to the synchronizing pulse separating circuit, or to the video frequency modulating circuit, to supply control potential to the desired ones of the circuits previously mentioned. Usually the R. F. and the I. F. circuits at least are so supplied.

Referring now to the schematic diagram of the horizontal deflection wave and high voltage generating circuit 48 shown in the drawing, a sawtooth wave generated in a sawtooth wave oscillating circuit (not shown) which may be entirely conventional is applied to the control grid of a horizontal deflection wave output amplifying electron discharge device shown here in the form of a beam-forming vacuum tube 50. Grid bias may be obtained by means of a resistor 52, in the cathode shunted by a bypass capacitor 54 in the cathode lead of the amplifier tube 50 as shown. The screen grid 55 is connected to a point of positive operating potential by means of a resistor 56 and is bypassed to a point of fixed reference potential or ground by a capacitor 58.

Deflection waves appearing across the anode-cathode circuit of the amplifying tube 50 are impressed upon the horizontal deflection wave output transformer 60 by connection to a primary winding 61 and a high voltage winding 62 to which is coupled a more or less conventional high voltage generating circuit. High voltage pulses appearing during the retrace time in the winding 62 are rectified by the high voltage rectifying device shown here as a high vacuum diode 64 and the energy is stored on the high voltage capacitor 66 to provide the final anode or ultor of the kinescope with a substantially continuous high through a series resistor 68. A capacitor 70 isolates direct current flow from the high voltage winding 62 from the deflection wave winding 74 and couples electrically adjacent terminals of the primary and deflection wave windings 61 and 74 for A. C. Deflection system windings 76 and 79 are connected directly to one terminal of the deflection wave winding 74 and through a variable inductor 82, serving as the size or width control, to a point of positive direct energizing potential and a capacitor 80 to an intermediate terminal on the deflection wave winding 74. A capacitor 84 couples the other terminal of the deflection wave winding 74 to the terminals of the variable inductor 82 remote from the deflection winding 79. Thus the deflection wave winding 74 is connected across the series circuit comprising the deflection system windings 76, 79 and the variable inductor 82. The variable inductor 82 acts as an adjustable shunt across the section of the deflection wave winding 74 and reduces the amplitude of the sawtooth current wave in the deflection windings as the inductance increases. At the same time it serves as a path for D. C. through the deflection system windings 76, 79.

Direct current from the point of positive potential flows through the variable inductor 82, the deflection system windings 76, 79, the deflection wave winding 74 and a load element 86 to the point of negative operating potential and, as shown here, ground. A meter 88 may be inserted in the circuit as shown to measure the current flowing through the load element 86. The load element 86 may be a resistor of value chosen to fit the circumstances but is preferably a part, or all, of the load formed by the remaining circuitry of the television receiver; that is, the anode-cathode impedances of the other tubes in the receiver circuit. Direct operating potential for the horizontal deflection wave amplifying tube 50 is applied by means of a damping device shown herein in the form of a diode vacuum tube 90 having a heater element 92 which is connected to a tap on the deflection wave winding 74 which maintains the potential difference between cathode and filament within rates values for the damper tube. The cathode 94 of the damping diode is connected to a tap on the primary winding 61 to which the anode of the amplifying tube 50 is connected. The damping tube is connected to the positive pole of the direct energizing potential source. The coupling capacitor 70 is charged by the conduction of the damping device or damping diode 90 in the circuit comprising the deflection system windings 76, 79 and the width controlling variable inductor 82. When the diode 90 is not conducting direct anode potential is applied to the anode of the amplifying tube 50 through the primary winding 61 from the capacitor 70, which is also acting as an energizing voltage boosting, familiarly termed B boost, capacitor to raise the potential at the primary winding 61 equal to the direct potential supply plus the charge in the capacitor 70 for application to the anode of the amplifying tube 50.

The direct current flowing in the deflection wave winding 74 is in such a direction as to oppose the saturating effect of the direct current in the anode circuit portion of the primary winding 61 of the transformer.

The direct current flowing through the deflection system windings 76, 79 is determined by the amount of current flowing through the load element 86. In practice the load element is adjusted by varying the number and types of circuits which form the load element 86, or if desired by using an adjustable resistor for the load element.

The direct current flowing through the deflection system winding 76, 79 acts to center the electron beam in the kinescope. This is necessary since without any linearity control as usually employed in such an arrangement the electron beam is off center which results in compression on the right side of the raster as seen on the face of the kinescope and expansion on the left side. This results in difficulty in centering the raster by adjusting the focus coil on magnetically focused systems and the centering magnets on electrostatically focused systems without causing the beam to strike the neck of the kinescope. This is overcome by supplying a fixed amount of direct current through the deflection system windings 76, 79 and since the charge is made in the deflection windings, neck shadow is avoided because these windings 76, 79 are arranged quite close to the neck portion of the kinescope and the beam is not interrupted by the neck for normal variations of the centering current.

In the circuit arrangement shown in the figure, a current of approximately 40–50 milliamperes provides an inch of movement in the raster which is sufficient to overcome the non-linear decentering and avoid the neck shadow resulting when this non-linearity is corrected by movement of the focus coil. For most television sets presently manufactured the amount of direct current to flow through the yoke may be predetermined and fixed in the design of the receiver to accommodate the kinescopes of all kinescopes in which the electron beam forming structure is within accepted tolerance.

The values below were used for the listed components of an embodiment of the invention as shown in the drawing which operated satisfactorily in a black and white television receiver.

| Ref. No. | Component | Type or Value |
|---|---|---|
| 50 | Amplifier tube | 6CD6. |
| 52 | Bias resistor | 100 ohms. |
| 54 | Bypass capacitor | 0.47 mf. |
| 56 | Dropping resistor | 15 kilohms. |
| 58 | Bypass capacitor | 0.047 mf. |
| 64 | Hi V rectifier tube | 1B3. |
| 70 | Blocking capacitor | 0.25 mf. |
| 76, 79 | Deflection windings | 12 mh. |
| 80 | Capacitor | 0.08 mf. |
| 82 | Width control | 50–200 mh. |
| 84 | Coupling capacitor | 1.0 mf. |
| 90 | Damping tube | 6W4GT. |

The power supply delivered 260 volts between the points marked plus (+) and minus (−) with 10–100 ma. current flowing through the load element shown as the resistor 86. Obviously other values will be found by those skilled in the art for other applications of the invention.

The invention claimed is:

1. A deflection circuit arrangement, including a deflection wave output transformer having at least one winding with at least three terminals, a deflection system winding having one terminal connected directly to one of the terminals of said transformer winding, a load element having one terminal connected to another terminal of said transformer winding, a coupling element incapable of passing direct current connected between the other terminal of said deflection system winding and a terminal of said transformer intermediate said one and said other terminals, and an inductance element connected between the positive pole of a source of energizing potential and the said other terminal of said deflection system winding.

2. A deflection circuit arrangement, including a deflection wave output transformer having at least one winding with at least three terminals, a deflection system winding having one terminal connected directly to one of the terminals of said transformer winding, a load element having one terminal connected to another terminal of said transformer winding, a coupling element incapable of passing direct current connected between the other terminal of said deflection system winding and a terminal of said transformer intermediate said one and said other terminals, an inductance element connected between the positive pole of a source of energizing potential and the said other terminal of said deflection system winding, and another coupling element incapable of passing direct current connected between the other terminal of said transformer winding and the terminal of said inductance element connected to said positive pole.

3. In a television receiver, a circuit arrangement for centering the raster without neck-shadow, comprising an output transformer having a core, a deflection wave winding and another winding intercoupled for alternating current translating arranged on said core, a deflection wave amplifier tube having the output circuit thereof connected to said other winding for both alternating current and direct current translation, a deflection system winding having one terminal connected to a terminal of said deflection wave winding for both direct and alternating current translation and the other terminal connected to another terminal of said deflection wave winding for alternating current translation, a variable inductance element having one terminal connected to the other terminal of said deflection system winding and another terminal connected to a further terminal of said deflection wave winding remote from said connection of said deflection system winding, a load element having one terminal connected to said further terminal of said deflection wave winding and means to apply direct energizing potential between the other terminal of said load element and the other terminal of said variable inductor.

4. In a television receiver, a circuit arrangement for centering the raster horizontally without neck-shadow, comprising a horizontal output transformer having a core, a deflection wave winding and another winding intercoupled for alternating current translation arranged on said core, a horizontal deflection wave amplifier tube having the output circuit thereof connected to said other winding for both alternating current and direct current translation, means including a damping tube to apply direct energizing potential to said other winding to energize said amplifier tube, which direct energizing potential tends to saturate the core of said transformer, a deflection system winding having one terminal connected to a terminal of said deflection wave winding for both direct and alternating current translation and the other terminal connected to another terminal of said deflection wave winding for alternating current translation, a variable inductance element having one terminal connected to the other terminal of said deflection system winding and another terminal connected to a further terminal of said deflection wave winding remote from said connection of said deflection system winding, a load element having one terminal connected to said further terminal of said deflection wave winding, and further means to apply further direct energizing potential between the other terminal of said load element and the other terminal of said variable inductor, said further direct energizing potential causing the deflection wave to oppose saturation of the core of said transformer.

5. In a television receiver, a horizontal deflection circuit arrangement including a horizontal deflection wave amplifier tube having a cathode electrode connected to a point of fixed reference potential and an anode electrode, a horizontal deflection wave output transformer having a primary winding and a deflection wave winding, each winding having a plurality of terminals, a capacitor interconnecting electrically adjacent terminals of said windings, the anode electrode of said amplifier tube being connected to a terminal of said primary winding, a load element connected between another terminal of said deflection wave winding and said point of fixed reference potential, a deflection system winding having one terminal connected to a terminal of the deflection wave winding of said output transformer, a capacitor intercoupling the other terminal of said deflection system winding and a terminal of said deflection wave winding intermediate the first said terminal of said deflection wave winding, and a variable inductor connected between the other terminal of said deflection system winding and said positive pole.

6. In a television receiver, a horizontal deflection circuit arrangement including a horizontal deflection wave amplifier tube having a cathode electrode connected to a point of fixed reference potential and an anode electrode, a horizontal deflection wave output transformer having a primary winding and a deflection wave winding, each winding having a plurality of terminals, a capacitor interconnecting electrically adjacent terminals of said windings, the anode electrode of said amplifier tube being connected to a terminal of said primary winding, a load element connected between another terminal of said deflection wave winding and said point of fixed reference potential, a deflection system winding having one terminal connected to a terminal of the deflection wave winding of said output transformer, a capacitor intercoupling the other terminal of said deflection system winding and a terminal of said deflection wave winding intermediate the first said terminal of said deflection wave winding, a variable inductor connected between the other terminal of said deflection system winding and said positive pole, and a further capacitor connected between said other terminal of said deflection wave winding and the terminal of said inductor connected to said positive pole.

7. In a television receiver, a horizontal deflection circuit arrangement including a horizontal deflection wave amplifier tube having a cathode electrode connected to a point of fixed reference potential and an anode electrode, a horizontal deflection wave output transformer having a primary winding and a deflection wave winding, each winding having a plurality of terminals, a capacitor interconnecting electrically adjacent terminals of said windings, a damping tube having a cathode connected to a terminal of said primary winding intermediate the first said terminals and an anode element connected to the positive pole of a source of direct energizing potential, the anode electrode of said amplifier tube being connected to a terminal of said high voltage winding, a load element connected between another terminal of said deflection wave winding and said point of fixed reference potential, a deflection system winding having one terminal connected to a terminal of the deflection wave winding of said output transformer, a capacitor intercoupling the other terminal of said deflection system winding and a terminal of said deflection wave winding intermediate the first said terminal of said deflection wave winding, a variable inductor connected between the other terminal of said deflection system winding and said positive pole, and a further capacitor connected between said other terminal of said deflection wave winding and the terminal of said inductor connected to said positive pole.

8. In a television receiver, a horizontal deflection circuit arrangement including a horizontal deflection wave amplifier tube having a cathode electrode connected to a point of fixed reference potential and an anode electrode, a horizontal deflection wave output transformer having a high voltage winding, a primary winding and a deflection wave winding, each winding having a plurality of terminals, a capacitor interconnecting electrically adjacent terminals of said primary and deflection wave windings, a high voltage generating circuit comprising a rectifier device having an anode element connected to another terminal of said high voltage winding and a cathode element connected to a terminal of a high voltage capacitor having the other terminal connected to said point of fixed potential, a damping tube having a cathode connected to a terminal of said primary winding intermediate the first said terminals and an anode element connected to the positive pole of a source of direct energizing potential, the anode electrode of said amplifier tube being connected to a terminal of said high voltage and of said primary windings, a load element connected between another terminal of said deflection wave winding and said point of fixed reference potential, a deflection system winding having one terminal connected to a terminal of the deflection wave winding of said output transformer, a capacitor intercoupling the other terminal of said deflection system winding intermediate the first said terminal of said deflection wave winding, a variable inductor connected between the other terminal of said deflection system winding and said positive pole, and a further capacitor connected between said other terminal of said deflection wave winding and the terminal of said inductor connected to said positive pole.

References Cited in the file of this patent

UNITED STATES PATENTS

| | | |
|---|---|---|
| 2,440,895 | Cawein | May 4, 1948 |
| 2,589,299 | Setchell | Mar. 18, 1952 |
| 2,598,134 | Schade | May 27, 1952 |
| 2,599,798 | Wissel | June 10, 1952 |
| 2,612,622 | Thalner | Sept. 30, 1952 |
| 2,644,103 | Fyler et al. | June 30, 1953 |
| 2,712,092 | Schwarz | June 28, 1955 |
| 2,712,616 | Leeds | July 5, 1955 |
| 2,713,652 | Baylor | July 19, 1955 |